Patented Sept. 8, 1953

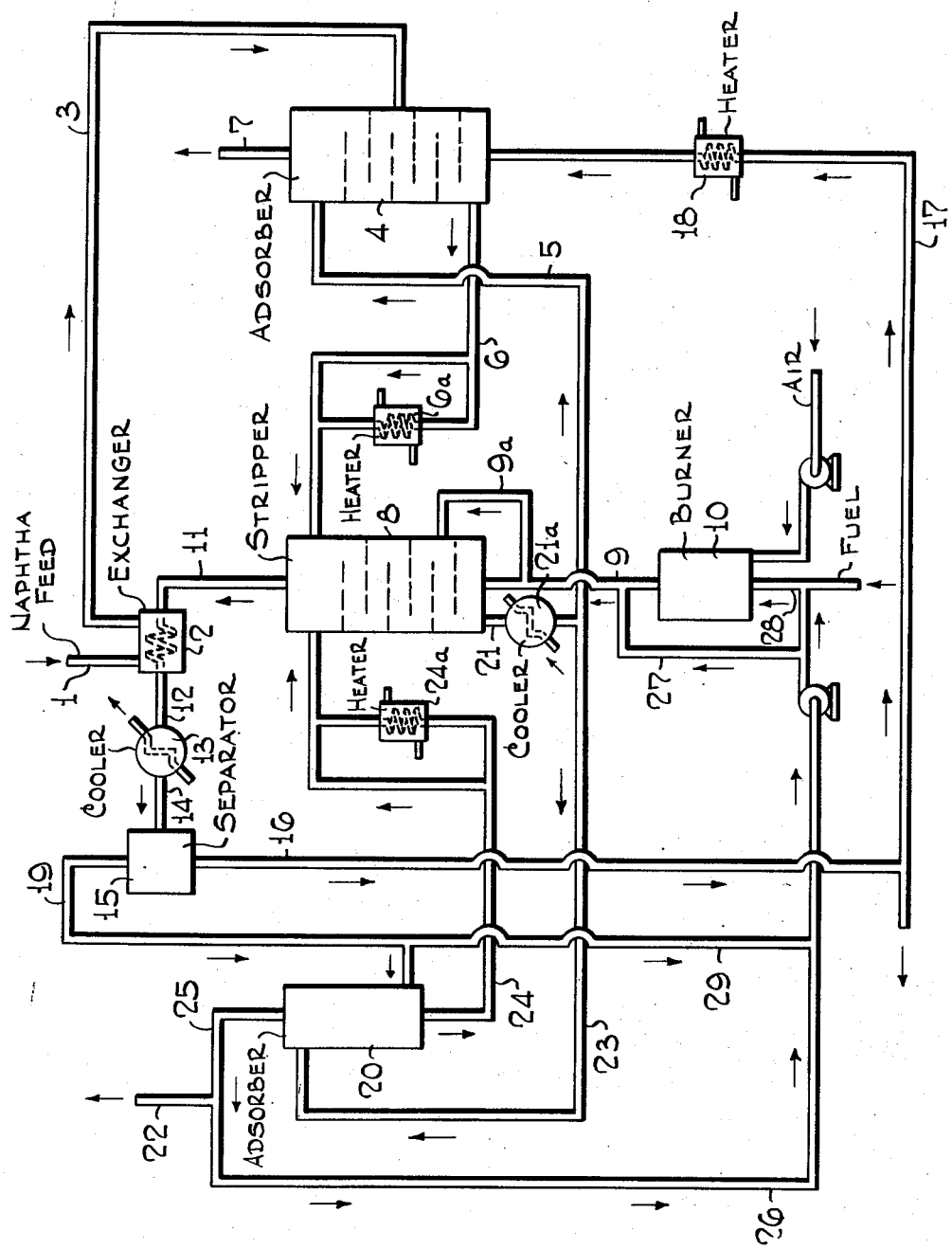

2,651,603

UNITED STATES PATENT OFFICE 2,651,603

FRACTIONATION WITH SOLID ADSORBENTS

Homer Z. Martin, Cranford, and Warren K. Lewis, Jr., Elizabeth, N. J., assignors to Standard Oil Development Company, a corporation of Delaware Application May 29, 1951, Serial No. 228,884

5 Claims. (Cl. 196—147)

The present invention relates to the separation and purification of hydrocarbons wherein the hydrocarbons are treated with a finely divided adsorbent material and pertains more particularly to a process of selectively removing certain constituents from a hydrocarbon mixture.

Many types of gaseous separations can be advantageously carried out through the use of a solid adsorbent, such as silica gel, activated charcoal, or the like. For instance, it is known that certain types of activated charcoal adsorb normal paraffins very selectively from mixtures of normal and isoparaffins; this affords an economic means of separating such mixtures when the boiling points are close together. Unfortunately, however, it has also been found that considerable quantities of stripping gas must be passed through the adsorbent at elevated temperatures, e. g. at 800° F., in order to obtain satisfactory removal of the adsorbate. This stripping gas has customarily been steam, largely because the stripped hydrocarbons can be easily separated from the steam by merely condensing the steam. On the other hand, production of the steam is a major item of expense, and in addition the large heat of vaporization of water greatly increases cooling requirements.

It is therefore the object of the present invention to provide a continuous process for the segregation of hydrocarbon mixtures by selective adsorbents which will not be subject to the objections above noted.

Other objects and advantages of the invention will be apparent from the more detailed description hereinafter.

For a further understanding of the invention, reference may be had to the accompanying drawing in which the single figure is an elevational view, generally diagrammatic, showing an apparatus embodying the improvements of the present invention.

The invention will now be described in connection with the separation of low octane constituents from petroleum naphthas.

Referring, therefore, to the drawing a naphtha fraction is introduced through line 1 and heated by indirect heat exchange in exchanger 2. Heated vapors are passed by line 3 to the middle of absorber 4. Tower 4 may be any type of conventional adsorption tower but is preferably a plate tower similar in construction to a conventional rectifying column. Activated cocoanut charcoal, such as that described in U. S. 2,425,535, issued August 12, 1947, to Henry J. Hibshman, is fed to the top of tower 4 through line 5 and flows down from one plate to the next all the way to the bottom countercurrent to rising naphtha vapors. The charcoal containing the low octane constituents consisting largely of normal paraffins is removed from the bottom of tower 4 through line 6 while the unadsorbed portion of the feed is removed from the top of the tower through line 7. This fraction has had its octane number materially increased because of the removal of the straight chain compounds.

The rich adsorbent in line 6 may be further heated if desired as by passing through heater 6a. It is then passed to the top of stripper 8 which is similar to tower 4. In this tower the adsorbent is passed countercurrent to a stream of flue gas introduced through lines 9 and 9a. This gas serves not only to strip adsorbed hydrocarbons from the adsorbent but also serves to supply at least a part of the necessary heat needed in the stripping operation. The flue gas may be produced very cheaply by burning fuel of any desired sort in air, for example in burner 10. Normal paraffin hydrocarbons, stripped from the charcoal, together with effluent flue gas are removed from tower 8 through line 11 and passed through heat exchanger 2 where they give up their heat to the incoming feed. The partially cooled gas leaves heat exchanger 2 by line 12 and is cooled further in cooler 13 and passed by line 14 to separator 15 where a partial separation between the hydrocarbons and flue gas takes place. Condensate consisting of condensed hydrocarbons is removed from separator 15 through line 16 and a portion is passed through line 17 and heater 18 to the bottom of tower 4 where it is used as reflux. Overhead from separator 15 is removed through line 19 and passed to the bottom of adsorber 20 which is in general similar to tower 4.

Returning now to stripping tower 8, stripped charcoal is removed through line 21, cooled in cooler 21a and in part is returned to the top of tower 4 through line 5 and in part is passed to the top of tower 20 by line 23 where it is passed countercurrent to the separator overhead introduced through line 19. In tower 20 the gas from the top of separator 15 is almost completely denuded of its hydrocarbon content by contact with the stripped adsorbent. The rich hydrocarbon-bearing adsorbent leaves the bottom of tower 20 through line 24 and is recycled to the top of stripper 8. If desired the rich adsorbent flowing in line 24 may be further heated by passing through heater 24a.

Overhead from adsorber 20 is removed through line 25 and may be bled to the atmosphere through line 22. However, it is an additional feature of this invention to return at least a portion of this gas to the stripper 8 as a portion of the stripping gas used therein and to recover at least a portion of the hydrocarbons not removed in tower 20. According to the preferred form of this invention a portion of the overhead from adsorber 20 is passed by lines 25, 26, 27 and 9 directly to the bottom of stripper 8 or by lines 25, 26 and 28 to burner 10 and thence to stripper 8 by line 9. Furthermore, by returning the gas flowing in line 26 to line 9, the temperature of the gas fed to the stripper from burner 10 is held down. In addition or alternatively, a portion of the gas flowing in line 19 may be passed through line 29 and combined with the gas flowing in line 26. If most of the recycle gas is taken from the top of separator 15 it is more desirable to pass it directly to the stripper by lines 29, 26, 27 and 9 so that the hydrocarbons contained therein will not be consumed. On the other hand, if the recycle gas is taken from the top of adsorber 20 by line 25 then it is more desirable to pass it to the burner by lines 26 and 28 before introducing it to the stripper through line 9, so that the burner temperature will be reduced.

The foregoing description does not by any means cover the possible uses of our invention nor the forms which it may assume, but serves to illustrate its fundamental principles and an assembly in which the novel features as disclosed above have been incorporated. It is obvious that changes in the details may be made without departing from either its novel characteristics or the spirit and scope of our invention as defined in the appended claims.

For example, other hydrocarbon feed stocks than naphthas can be processed, such as mixtures of iso and normal paraffins, mixtures of aromatics and paraffins, olefins and paraffins, etc. Heavy materials are preferred, however, since by virtue of their low vapor pressure a large fraction of the hydrocarbons in the stripper overhead can be condensed in the separator and hence the amount which has to be recovered in the auxiliary adsorber is not excessive. Other adsorbents, such as silica gel, bauxite, activated alumina, ordinary activated alumina, ordinary activated carbon, etc. can be used instead of cocoanut charcoal. Various modifications of the apparatus will also be obvious to one skilled in the art. For example, the adsorbent could be cooled by coils situated within the adsorber instead of by external coolers. Furthermore, the auxiliary adsorber and the stripper can be combined into one tower, the adsorber constituting the upper portion.

It is also within the scope of this invention to operate towers 4 and 20 differently from that described above. Contact between the adsorbent and the hydrocarbon vapors may be obtained by means of the fluid technic or by slurry operation. In the case of the former, the particle size of the adsorbent is very small and the hydrocarbon is maintained in the vapor phase under conditions of flow such that the adsorbent is maintained as a pseudo liquid in accordance with principles well known in the art. In the case of the slurry technic the hydrocarbons are maintained in the liquid phase and the particle size of the adsorbent is somewhat coarser.

The nature of the present invention having been thus fully set forth and specific examples of the same given, what is claimed as new and useful and desired to be secured by Letters Patent is:

1. Process for separating hydrocarbon mixtures into two components which comprises introducing a hydrocarbon feed stock containing a plurality of components into the midsection of a first adsorption zone, introducing a solid adsorbent into the top of said adsorption zone, passing the feed stock counter-currently to said solid adsorbent, removing unadsorbed components from the top of said adsorption zone, removing solid adsorbent containing the preferentially adsorbed components from the bottom of said adsorption zone, passing the withdrawn solid adsorbent to the top of a stripping zone, introducing flue gas into the bottom of said stripping zone, passing the solid adsorbent countercurrently to the flue gas whereby the preferentially adsorbed hydrocarbons are stripped from the solid adsorbent, recycling a first portion of the stripped adsorbent to the first adsorption zone, withdrawing the flue gas-hydrocarbon mixture from the top of said stripping zone, cooling said flue gas-hydrocarbon mixture to condense at least a portion of said hydrocarbons, removing the condensed hydrocarbons, recycling at least a portion of said condensed hydrocarbons to the bottom of said first adsorption zone as reflux therein, passing a portion of said flue gas and uncondensed hydrocarbons to the bottom of a second adsorption zone, recycling the remaining portion of said flue gas and uncondensed hydrocarbons to the bottom of said stripping zone, introducing a second portion zone, introducing solid adsorbent to the top of said second adsorption zone, passing the flue gas hydrocarbon mixture countercurrently to said solid adsorbent whereby most of said hydrocarbons are adsorbed, recycling the solid adsorbent and adsorbed hydrocarbons to the top of said stripping zone, and recycling at least a portion of the flue gas from said second adsorption zone to the bottom of said stripping zone.

2. Process as defined in claim 1, in which the hydrocarbon feed stock is petroleum naphtha.

3. Process as defined in claim 1, in which the solid adsorbent is activated charcoal.

4. Process as defined in claim 1, in which the solid adsorbent is silica gel.

5. Process for separating hydrocarbon mixtures into two components which comprises introducing a hydrocarbon feed stock containing a plurality of components into the midsection of a first adsorption zone, introducing a solid adsorbent into the top of said first adsorption zone, passing the feed stock countercurrently to said solid adsorbent, removing unadsorbed components from the top of said adsorption zone, removing solid adsorbent containing the preferentially adsorbed components from the bottom of said adsorption zone, passing the withdrawn solid adsorbent to the top of a stripping zone, introducing flue gas into the bottom of said stripping zone, passing the solid adsorbent countercurrently to the flue gas whereby the preferentially adsorbed hydrocarbons are stripped from the solid adsorbent, recycling at least a portion of the stripped adsorbent to the first adsorption zone, withdrawing the flue gas-hydrocarbon mixture from the top of said stripping zone, cooling said flue gas-hydrocarbon mixture to condense at least a portion of said hydrocarbons, removing the condensed hydrocarbons, recycling at least a portion of said condensed hydrocarbons to the bottom of said first adsorption zone as reflux therein, passing at least a portion of said flue gas and uncondensed hydrocarbons to the bottom of a second adsorption zone, introducing solid adsorbent to the top of said second adsorption zone, passing the flue gas-hydrocarbon mixture countercurrently to said solid adsorbent within said second adsorption zone whereby most of said hydrocarbons are adsorbed, recycling the solid adsorbent and adsorbed hydrocarbons from the second adsorption zone to the top of said stripping zone and recycling the flue gas from said second adsorption zone to the bottom of said stripping zone.

HOMER Z. MARTIN.
WARREN K. LEWIS, Jr.

References Cited in the file of this patent

UNITED STATES PATENTS

| Number | Name | Date |
|---|---|---|
| 2,425,535 | Hibshman | Aug. 12, 1947 |
| 2,519,342 | Berg | Aug. 22, 1950 |
| 2,519,873 | Berg | Aug. 22, 1950 |
| 2,522,426 | Black | Sept. 12, 1950 |
| 2,529,289 | Gilliland | Nov. 7, 1950 |